(12) United States Patent
Steinbach et al.

(10) Patent No.: US 7,698,113 B2
(45) Date of Patent: Apr. 13, 2010

(54) METHOD TO AUTOMATICALLY DETECT AND PREDICT PERFORMANCE SHORTAGES OF DATABASES

(75) Inventors: Torstein Steinbach, Boeblingen (DE); Michael Reichert, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 11/432,653

(22) Filed: May 11, 2006

(65) Prior Publication Data

US 2007/0018601 A1    Jan. 25, 2007

(30) Foreign Application Priority Data

Jun. 29, 2005   (EP)   ................. 05105840

(51) Int. Cl.
  *G06F 17/18*  (2006.01)
  *G06F 19/00*  (2006.01)
  *G06F 17/40*  (2006.01)
  *G06F 7/60*   (2006.01)
  *G06F 11/00*  (2006.01)
  *G06E 1/00*   (2006.01)

(52) U.S. Cl. ............ 703/2; 702/181; 702/182; 702/183; 702/185; 702/187; 705/7; 706/27; 714/37; 714/38; 714/47; 703/22

(58) Field of Classification Search ............ 318/568; 702/181–183, 185–187; 706/27; 714/37, 714/38, 47
See application file for complete search history.

(56) References Cited

U.S. PATENT DOCUMENTS

| 5,684,404 A |   | 11/1997 | Millar |          |
|---|---|---|---|---|
| 5,720,003 A | * | 2/1998 | Chiang et al. | .......... 706/21 |
| 5,796,633 A | * | 8/1998 | Burgess et al. | .......... 702/187 |
| 6,073,089 A | * | 6/2000 | Baker et al. | .......... 702/185 |
| 6,182,022 B1 | * | 1/2001 | Mayle et al. | .......... 702/182 |

(Continued)

FOREIGN PATENT DOCUMENTS

EP    1455313    4/2004

(Continued)

OTHER PUBLICATIONS

Garg et al. "A Methodology for Detection and Estimation" in International Symposium on Software Reliability Engineering, 1998.*

(Continued)

*Primary Examiner*—Kamini S Shah
*Assistant Examiner*—Shambhavi Patel
(74) *Attorney, Agent, or Firm*—Hovey Williams LLP

(57) ABSTRACT

A Method for self controlled early detection and prediction of a performance shortage of an application is described comprises the steps of monitoring at least one performance parameter of the application, storing performance data including a time dependency of said performance parameter, using said performance data to compute a mathematic function describing a time dependent development of said performance parameter, using said mathematical function to compute a point in time when the performance parameter exceeds a certain threshold, and generating and outputting a prediction comprising information that a performance shortage of the application is expected at said computed point in time, if said point in time lies within a settable timeframe.

18 Claims, 4 Drawing Sheets

U.S. PATENT DOCUMENTS

| | | | |
|---|---|---|---|
| 7,050,936 B2 * | 5/2006 | Levy et al. | 702/181 |
| 7,149,657 B2 * | 12/2006 | Goebel et al. | 702/183 |
| 7,181,651 B2 * | 2/2007 | Gross et al. | 714/37 |
| 7,191,367 B2 * | 3/2007 | Ito et al. | 714/47 |
| 2002/0174384 A1 * | 11/2002 | Graichen et al. | 714/37 |
| 2003/0004679 A1 * | 1/2003 | Tryon et al. | 702/182 |
| 2005/0044451 A1 * | 2/2005 | Fry et al. | 714/38 |
| 2005/0096953 A1 * | 5/2005 | Washington et al. | 705/7 |

FOREIGN PATENT DOCUMENTS

| | | |
|---|---|---|
| WO | WO0117169 | 3/2001 |
| WO | WO 03067480 | 8/2003 |

OTHER PUBLICATIONS

Schulz et al. "Frame of Interest Approach on Quality of Prediction for Agent-Based Network Monitoring". Jan. 2004.*

Schneidewind, Norman. "Reliability Modeling for Safety-Critical Software", IEEE Transactions on Reliability, vol. 46, No. 1, Mar. 1997.*

Engel, et al. "Prognostics, The Real Issues with Predicting Life Remaining", IEEE 2000.*

Fitzgibbon, et al. "A Failure-Forecast Method based on Weibull and Statistical-Pattern Analysis", 2002 Proceedings Annual Reliability and Maintainability, IEEE 2002.*

Hoffmann, et al. "Advanced Failure Prediction in Complex Software Systems", Apr. 2004.*

Ho, et al. "A Study of the Connectionist Models for Software Reliability Prediction", Computers and Mathematics with Applications 46 (2003).*

Monitoring Performance from the Workstation; Copyright International Business Machines Corporation 1997, 2006.

Juan Peralta et al., ADANN: Automatic Design of Artificial Neural Networks 1964 (Copyright 2008 ACM).

* cited by examiner

METHOD TO AUTOMATICALLY DETECT AND PREDICT PERFORMANCE SHORTAGES OF DATABASES

RELATED APPLICATIONS

The present application is a nonprovisional patent application and claims priority benefit, with regard to all common subject matter, of earlier-filed German patent application number 05105840.2, titled "METHOD TO AUTOMATICALLY DETECT AND PREDICT PERFORMANCE SHORTAGES OF DATABASES," filed Jun. 29, 2005. The identified earlier-filed application is hereby incorporated by reference into the present application.

BACKGROUND OF THE INVENTION

1. Field of the Invention

The present invention relates to the detection and prediction of software performance shortages by monitoring performance parameters such as memory and storage usage, available CPU capacity, and the frequency of application processes.

2. Description of Prior Art

It is very important to provide professional software applications or computing systems, such as databases, with minimal maintenance requirements. Such maintenance often involves ensuring that the software is operating at acceptable levels of performance and efficiency, which requires monitoring the resources used by the software and supporting the software with at least a minimal amount of resources. If a resource becomes unavailable or depleted, such as where the resource is used by the software or is damaged, the corrective measures must be implemented by, for example, dynamically extending full storage devices. It is thus important to know when to implement such corrective measures.

Prior art methods of implementing such corrective measures include defining thresholds for certain performance parameters, where such thresholds may correspond to a performance parameter of an application or to the availability of one or more resources. For example, the performance parameters may correspond to a frequency of processes carried out by an application, a table space fill grade, available memory or storage, and CPU usage.

If a performance parameter exceeds its threshold an exception occurs and an administrator, such as a database administrator (DBA), is informed. Exemplary performance thresholds include 90% table space fill grade, 80% disc storage used, and the like. The upper thresholds are preferably defined such that the application provides full performance until one ore more performance parameters reach their thresholds. Within periodic time intervals, measurements are carried out to determine whether each of the performance parameters has exceeded its respective threshold.

Unfortunately, the prior art suffers from various problems and limitations. For example, by the time the system alerts the administrator to the need for corrective measures, a performance threshold has already been exceeded and it is likely that the system or application will operate at less than optimal levels between the time the administrator is notified and the time the administrator implements the corrective measures. Furthermore, preventing one or more of the performance parameters from reaching the thresholds requires the administrator to spend time monitoring the parameters.

Accordingly, there is a need for an improved method of ensuring optimal performance of a computer system that does not suffer from the problems and limitations of the prior art.

SUMMARY OF THE INVENTION

The present invention provides a method for automated early detection and prediction of a performance shortage of an application.

The invention computes the point in time when a performance shortage of the application is expected because one or more performance parameters will exceed certain thresholds defined by, for example, an administrator. Said point in time is compared with a timeframe, such as 14 days, also defined by the administrator. If the point in time lies within this timeframe, a prediction preferably comprising an alert or an exception will be generated. If the point in time lies far in the future, no prediction will be generated at the very moment. This avoids generation of useless alerts.

An advantage the present invention has over the state of the art is that it allows to reliably computing points in time, when performance shortages will occur due to one ore more performance parameters exceeding certain settable thresholds. Doing so, the invention allows to automatically identify said performance shortages e.g. with regard to their relevance in a certain settable timeframe in the near future. By doing so, e.g. unnecessary alerts concerning performance shortages far in the future can be avoided. Furthermore by computing a mathematic function describing the time dependency of the performance parameters monitored, e.g. periodic long term trends like peak loads towards week end, end of year and the like can be taken into consideration.

Furthermore, the quality of the mathematic function raises the longer the monitoring takes place. This results in a raising reliability of the predictions generated according to this method. Furthermore, no warning threshold is required anymore.

In a preferred embodiment of said invention, a quality indication value is computed and assigned to the mathematic function, wherein a prediction is only generated if said quality indication value is higher than a settable quality threshold. Preferably the quality indication value increases the longer the monitoring takes place. This is because long-term trends, including periodic trends, can be more reliably accounted for by the mathematic function the longer the monitoring takes place.

In a preferred embodiment of the invention, the mathematic function takes into consideration experience values, e.g. gained from similar applications. The experience values can be stored together with the performance data, such as in a knowledge base.

In a preferred embodiment of said invention, counter measurements are carried out to verify the mathematic function by comparing trend data computed with the mathematic function and comprising estimated values for the performance parameter at defined points in time and comparing said trend data with counter measurements carried out at said defined points in time. The administrator can give said points in time. It is also thinkable to use the counter measurements to compute the quality of the mathematic function. Thereby the counter measurements are carried out continuously or in settable intervals of time. Preferably the settable intervals also trigger the points in time trend data are computed for.

In a preferred embodiment of said invention, the prediction comprises information about the kind of performance parameter that is estimated to exceed its threshold at said computed point in time. It is also thinkable, that the prediction comprises an exception.

In another preferred embodiment of said invention, the monitoring of the performance parameter and the storing of performance data as well as the computing the mathematic function takes place continuously or in settable intervals of time.

According to the invention, the monitored performance parameter comprises e.g. the memory used by said application and/or the storage used by said application and/or the CPU capacity used by said application and/or the frequency of processes performed by said application. It is also thinkable that the monitored performance parameter comprises the access time of said application, e.g. the access time on a storage device.

In a preferred embodiment of the invention, the application comprises a database. The application may also comprise other computer programs, such as, for example, word processors, diagnostic and testing software, computer-aided drafting (CAD) software, and so forth.

In a particularly preferred embodiment of said invention, instead of the description of the time dependant development of the performance parameter, the mathematic function describes a time dependent development of the performance of the application and wherein the mathematic function is used to compute a point in time when the performance of said database is falling below a certain threshold.

In another particularly preferred embodiment of said invention, instead of the performance of an application, the method is used to predict the performance of a storage device and wherein the performance parameter comprises the used space on said storage device. Such a method can be used to predict a point in time when the storage device has no more free space left or the space left is smaller than a settable limit of free space. This could be used e.g. to prepare the exchange of said storage device, e.g. for a hot swap storage device.

In a preferred embodiment of said invention, said storage device is used by a database.

In a particularly preferred embodiment of the invention, said method is performed by a computer program product stored on a computer usable medium comprising computer readable program means for causing a computer to perform the method mentioned above, when said computer program product is executed on a computer.

The last part of the technical purpose of the invention is met by a device according to claim 18, comprising means to monitor at least one performance parameter of an application, means to store performance data comprising the time dependency of said performance parameter of said application, means to compute a mathematic function describing a time dependent development of said performance parameter using the collected and stored performance data, means to use said mathematic function to compute a point in time, when the performance parameter is excepted to exceed a certain settable threshold and the performance of a database will decrease, means to decide if said point in time lies within a settable warning timeframe and means to generate and output a prediction comprising information that a performance shortage of the application is expected at said computed point in time, if said point in time lies within said settable timeframe.

In a preferred embodiment of the invention, the device also comprises means to compute and assign a quality indication value to said mathematic function, wherein said quality indication value increases the longer the monitoring takes place, and wherein the device comprises means to compare said quality indication value with a settable quality threshold. It is also thinkable that the device also comprises means to store experience values to be used to compute said mathematic function and/or means to perform said application.

Another preferred embodiment of the device according to the invention is characterized by means to perform counter measurements.

A particularly preferred embodiment of the invention is characterized in that the means to decide if said point in time lies within a settable warning timeframe and the means to generate and output a prediction comprising information that a performance shortage of the application is expected at said computed point in time, if said point in time lies within said settable timeframe, comprise an exception agent.

In another preferred embodiment of the invention, the means to store performance data comprising the time dependency of said performance parameter of said application comprise a knowledge base. It is also thinkable that the means to store experience values to be used to compute said mathematic function comprise a knowledge base.

A preferred embodiment of the invention is characterized in that the means to compute the mathematic function comprise a trend agent.

A particularly preferred embodiment of the invention is characterized in that said device comprises a knowledgebase to be used to store performance data, to provide said performance data to a trend agent computing said mathematic function, and to store trend data comprising the time dependant development of the performance parameter computed with said mathematic function, wherein said knowledge base provides said trend data to an exception agent deciding to generate a prediction if said trend data comprise information, that the performance parameter will exceed its threshold within a settable timeframe.

The foregoing, together with other objects, features, and advantages of this invention can be better appreciated with reference to the following detailed description, claims and drawings.

BRIEF DESCRIPTION OF THE DRAWINGS

An embodiment of the present invention is described in detail below with reference to the attached drawing figures, wherein.

DETAILED DESCRIPTION

Figure 1:
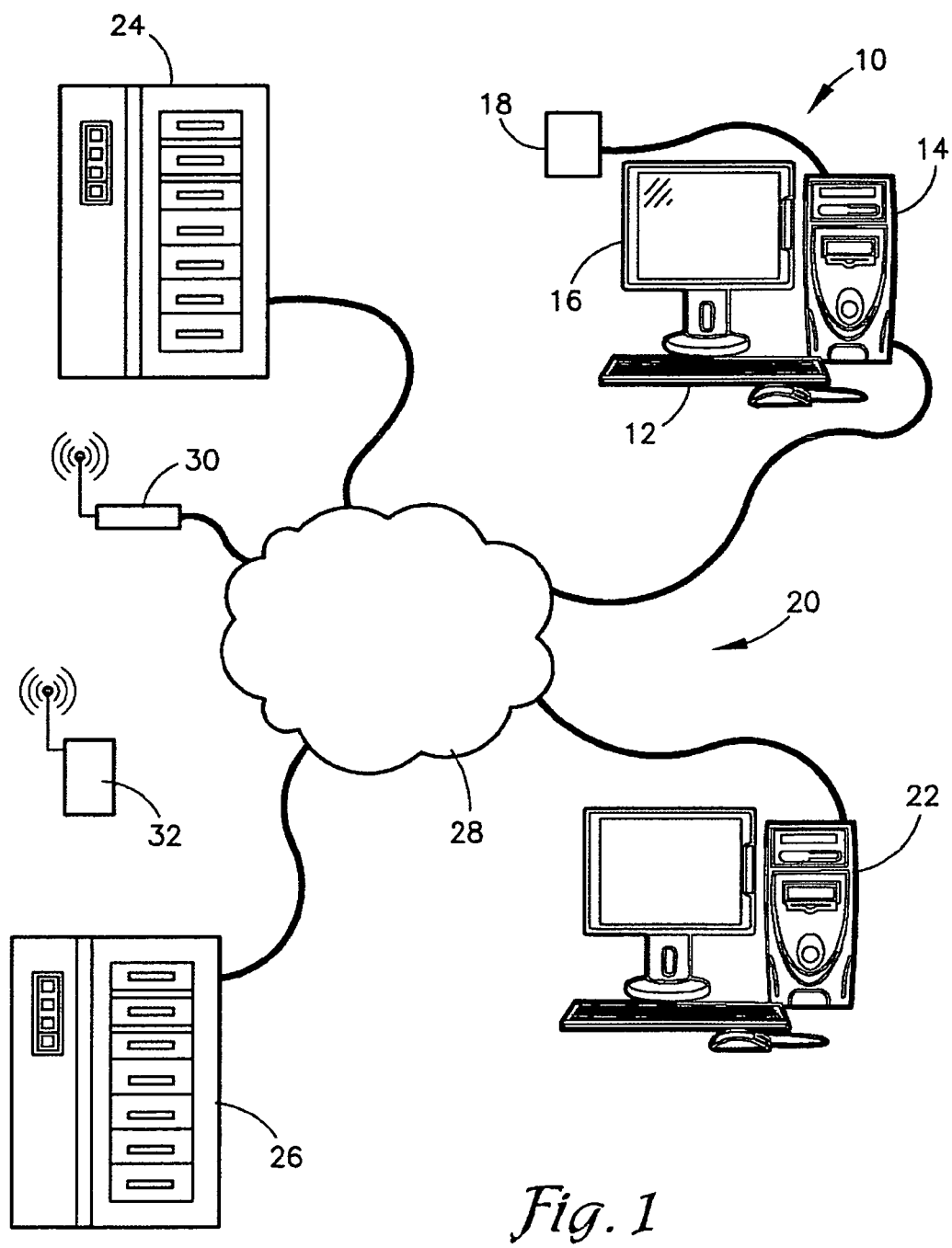
FIG. 1 is a diagram of a computer network operable to implement a computer program of the present invention.

The present invention relates to a system and method of automatically predicting when performance parameters will exceed defined thresholds. The method of the present invention is especially well-suited for implementation on a computer or computer network, such as the computer 10 illustrated in FIG. 1 that includes a keyboard 12, a processor console 14, a display 16, and one or more peripheral devices 18, such as a scanner or printer. The computer 10 may be a part of a computer network, such as the computer network 20 that includes one or more client computers 10,22 and one or more server computers 24,26 and interconnected via a communications system 28.

The present invention may also be implemented, in whole or in part, on a wireless communications system including, for example, a network-based wireless transmitter 30 and one or more wireless receiving devices, such as a hand-held computing device 32 with wireless communication capabilities. The present invention will thus be generally described herein as a computer program. It will be appreciated, however, that the principles of the present invention are useful independently of a particular implementation, and that one or more of the steps described herein may be implemented without the assistance of a computing device.

The present invention can be implemented in hardware, software, firmware, or a combination thereof. In a preferred embodiment, however, the invention is implemented with a computer program. The computer program and equipment described herein are merely examples of a program and equipment that may be used to implement the present invention and may be replaced with other software and computer equipment without departing from the scope of the present invention.

The computer program of the present invention is stored in or on a computer-readable medium residing on or accessible by a host computer for instructing the host computer to implement the method of the present invention as described herein. The host computer may be a server computer, such as server computer 24, or a network client computer, such as computer 10. The computer program preferably comprises an ordered listing of executable instructions for implementing logical functions in the host computer and other computing devices coupled with the host computer. The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

The ordered listing of executable instructions comprising the computer program of the present invention will at times hereinafter be referred to simply as "the program" or "the computer program." It will be understood by those skilled in the art that the program may comprise a single list of executable instructions or two or more separate lists, and may be stored on a single computer-readable medium or multiple distinct media. The program will also be described as comprising various "code segments," which may include one or more lists, or portions of lists, of executable instructions. Code segments may include overlapping lists of executable instructions—that is, a first code segment may include instruction lists A and B, and a second code segment may include instruction lists B and C.

In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

Performance parameters, as used in this document, include all parameters that may influence the performance of, or may be used to measure or indicate the performance of, a software application, computer, or computer system. Thus, the performance parameters discussed herein are exemplary in nature and not limiting.

Monitoring, as used in this document, includes constant monitoring as well as periodic monitoring.

Figure 2:
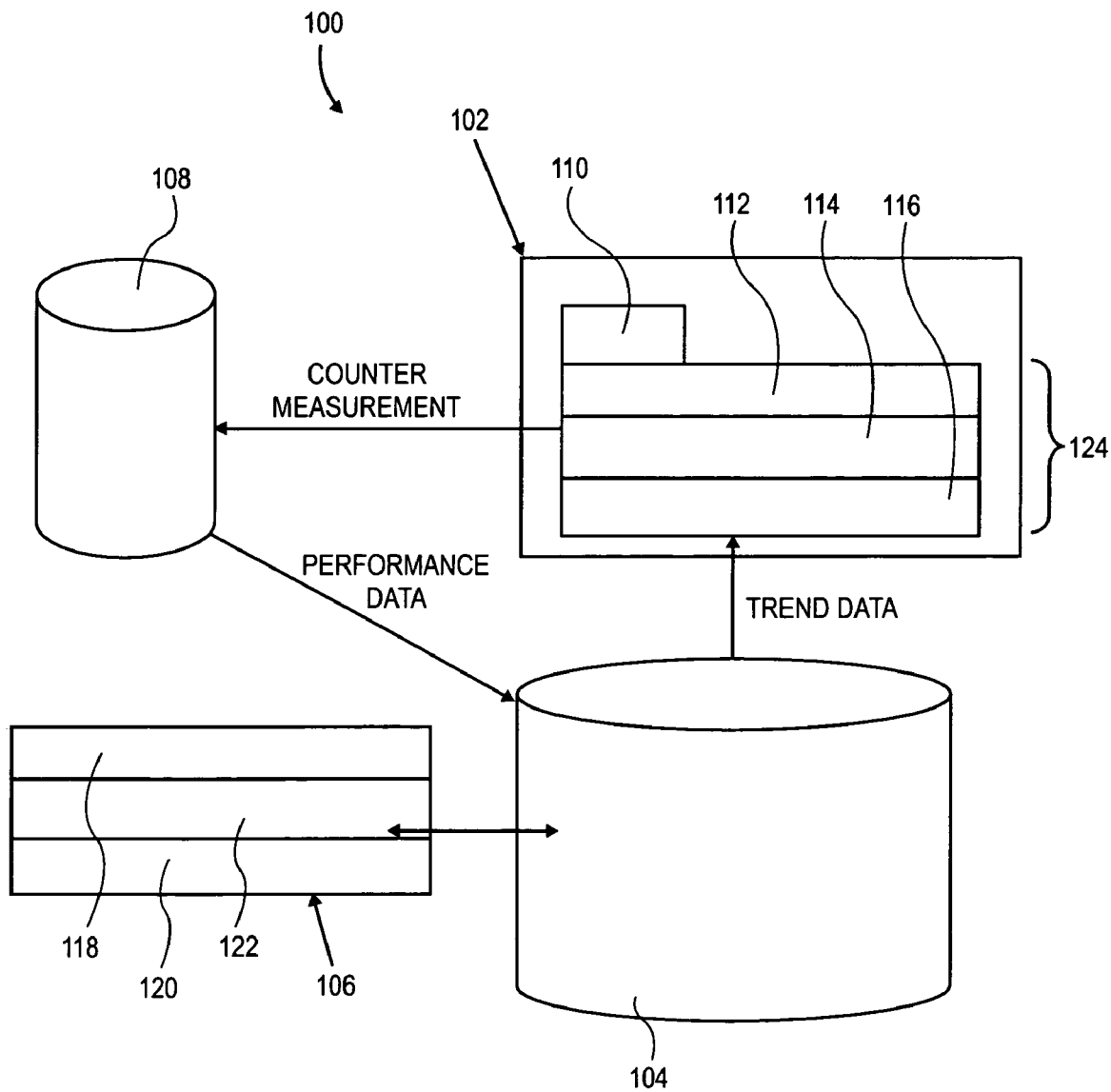
FIG. 2 is a schematic diagram illustrating the interaction of various elements of a system incorporating the computer program of the present invention.

The technical purpose of the present invention is to develop a method, computer program, and system that minimizes or eliminates unnecessary exceptions. As shown in FIG. 2, a system 100, which may correspond to one or more of the computers 10,22,24,26 of FIG. 1, implements the program of the present invention. The system 100 comprises a performance monitoring system 102; a knowledge base 104 for storing performance data including a time dependency of a monitored performance parameter; a trend agent 106; and a database 108.

The monitoring system 102 further includes means 110 for monitoring at least one performance parameter of the database 108; means 112 for carrying out counter measurements to verify the quality of the mathematic function; means 114 for deciding if said point in time lies within a settable warning timeframe; and means 116 for generating and outputting a prediction including a time corresponding to when a performance shortage of the application is expected, if said point in time lies within said settable timeframe. Each of the various portions 110, 112, 114, and 116 of the monitoring system 102 may correspond, for example, to a segment of the program of the present invention.

The trend agent 106 further comprises means 118 for computing a mathematic function describing time dependant development of the performance parameter by using the performance data; means 120 for using said mathematic function to compute a point in time when the performance parameter will exceed a pre-determined threshold; and means 122 for computing trend data describing values of the performance parameter at discrete intervals of time. Each of the various portions 118, 120, and 122 of the trend agent 106 may correspond, for example, to a segment of the program of the present invention. Thus, the trend agent 106 is responsible for computing the mathematic function, the point in time when the performance parameter will exceed its threshold, and the trend data.

The knowledge base 104 is used to store the performance data collected from monitoring the database 108. The knowledge base 104 provides the performance data to the trend agent 106, which the trend agent 106 then uses to compute the mathematic function. The trend data computed by the trend agent 106 is also stored in the knowledge base 104.

The knowledge base 104 provides the trend data to an exception agent 124 which comprises the means 112 for carrying out counter measurements to verify the quality of the mathematic function, the means 114 for deciding if said point in time lies within a predetermined warning timeframe, and the means 116 for generating and outputting a prediction including a time at which a performance shortage of the system 100 is expected, if said point in time lies within said selected timeframe. Thus, the exception agent 124 is responsible for carrying out the counter measurements, for comparing the counter measurements with the trend data, and for computing a quality indication value indicating the quality of the mathematic function.

The quality indication value is computed by comparing the trend data with the counter measurements. Furthermore, the exception agent 124 is responsible for comparing the point in time the performance parameter will exceed its threshold computed by the trend agent with a warning timeframe given by the administrator. The exception agent 124 also compares the quality indication value with a quality threshold provided by the administrator.

If the exception agent 124 determines that the point in time the performance parameter will exceed its threshold lies within the warning timeframe and the quality indication value is higher than the quality threshold, the exception agent generates a prediction. Said prediction comprises information such as which performance parameter will exceed its threshold and at what point in time the parameter will exceed the threshold. The exception agent automatically sends this prediction to the administrator.

While the performance monitoring system 102, the knowledge base 104, and the trend agent 106 are shown as separate entities in FIG. 2, the invention is not so limited and all three may be substantially integral, such we where the performance monitoring system 102 includes the knowledgebase 104 and the trend agent 106.

Figure 3:
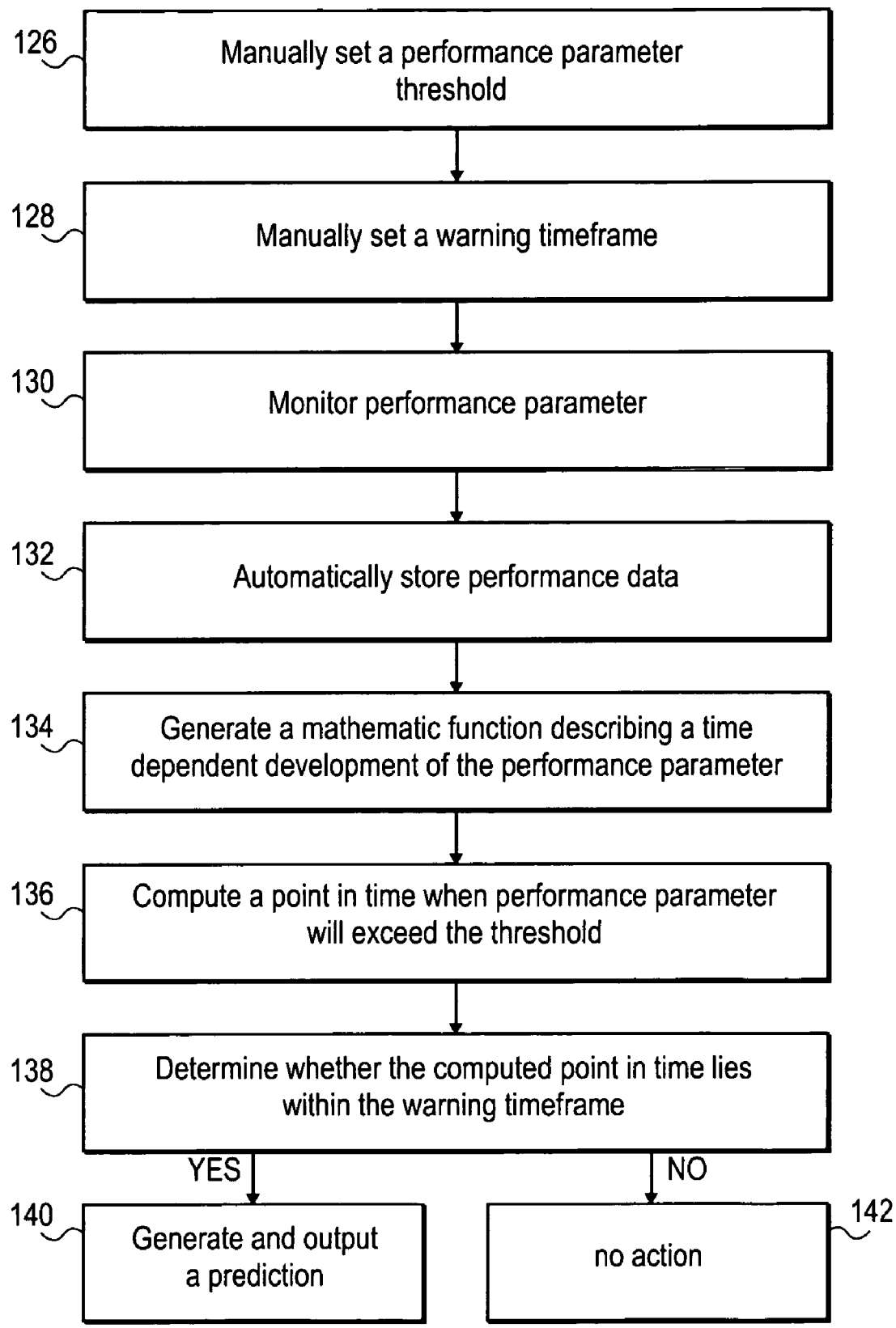
FIG. 3 is a flowchart of steps involved in a method of the present invention.

FIG. 3 is a flow chart illustrating a procedure of the method according to the invention. To prepare the automatic procedure of the method, an administrator, such as a database administrator, first sets one or more performance parameter thresholds of an application to be monitored as well as a warning timeframe, as depicted in blocks 126 and 128. Preferably the thresholds are set in a way that the performance of the application will not decrease until said performance parameter exceeds its threshold. The application can be, for example, the database 108 of FIG. 2.

After the performance parameter thresholds and the timeframes are set, one or more performance parameters of the application are monitored, as depicted in block 130. This step is performed substantially automatically using a computer. These performance parameters preferably relate to resources used by the application, such as the random access memory or other memory used by the application, the space of a storage device used by the application, such as the space on disc storage, the CPU consumption of the application and the like. Thereby the thresholds preferably define the ratio of used resources to the total capacity of the resources assigned to the application.

The time dependency of the performance parameters may be stored in the knowledgebase 104 of FIG. 2 in the form of performance data, as depicted in block 132. In a further step the performance data comprising the time dependency of the performance parameters is used to automatically compute a mathematic function describing the time dependant development of one or more performance parameters, as depicted in block 134.

The mathematical function is used to compute a point in time when one or more performance parameters will exceed their thresholds, as depicted in block 136. At this point in time the performance of the application declines and a performance shortage occurs. The point in time is compared with the warning timeframe pre-defined by the administrator. The warning timeframe begins at the present time and ends in the near future, such as in fourteen days.

The mathematic function is progressively more accurate the longer the monitoring of the performance parameter takes place. When long term monitoring takes place the mathematic function progressively incorporates more long-term trends, such as periodic increases and decreases in memory or storage usage. By way of example, there may be an increase in usage from Monday to Friday, and a decrease in usage from Saturday to Sunday when swapping of data takes place, such as from a disc storage to a tape storage.

To take the increasing accuracy of the mathematic function with increasing monitoring time into consideration, it is possible to compute a quality indication value for the mathematical function. The quality indication value increases the longer the monitoring takes place. Additional properties for the quality indication value include the overall number of measurements and the sampling rate, i.e. how many of the available measurements have been considered for calculating the function. This quality indication value preferably is also part of the prediction, wherein the quality indication value preferably has to exceed a selectable threshold to generate a prediction.

The next step involves determining whether the computed point in time lies within the warning timeframe by comparing the point in time with the warning timeframe, as depicted in block 138. If this is true, a prediction is automatically generated as depicted in block 140. The prediction includes information such as which performance parameter is likely to exceed its threshold and at what point in time the parameter is likely to exceed the threshold, and is automatically sent to the administrator. If the computed point in time does not lie within the timeframe no action is taken, as depicted in block 142.

The mathematic function may be used to compute trend data describing the development of the performance parameters in the future as well as to compute a point in time when one or more performance parameters exceed their thresholds. This trend data can be used to compare the quality of the mathematic function and the quality of the prediction of what performance parameter will exceed its threshold and at what point in time.

To compare the quality of the mathematic function, counter measurements of the monitored performance parameters can be carried out, wherein said counter measurements automatically are compared with the trend data. This comparison can be used to compute a quality indication value to be assigned to the mathematic function. The quality indication value may then be used to generate a prediction, if, for example, the quality indication value exceeds a quality threshold defined by the administrator.

Figure 4:
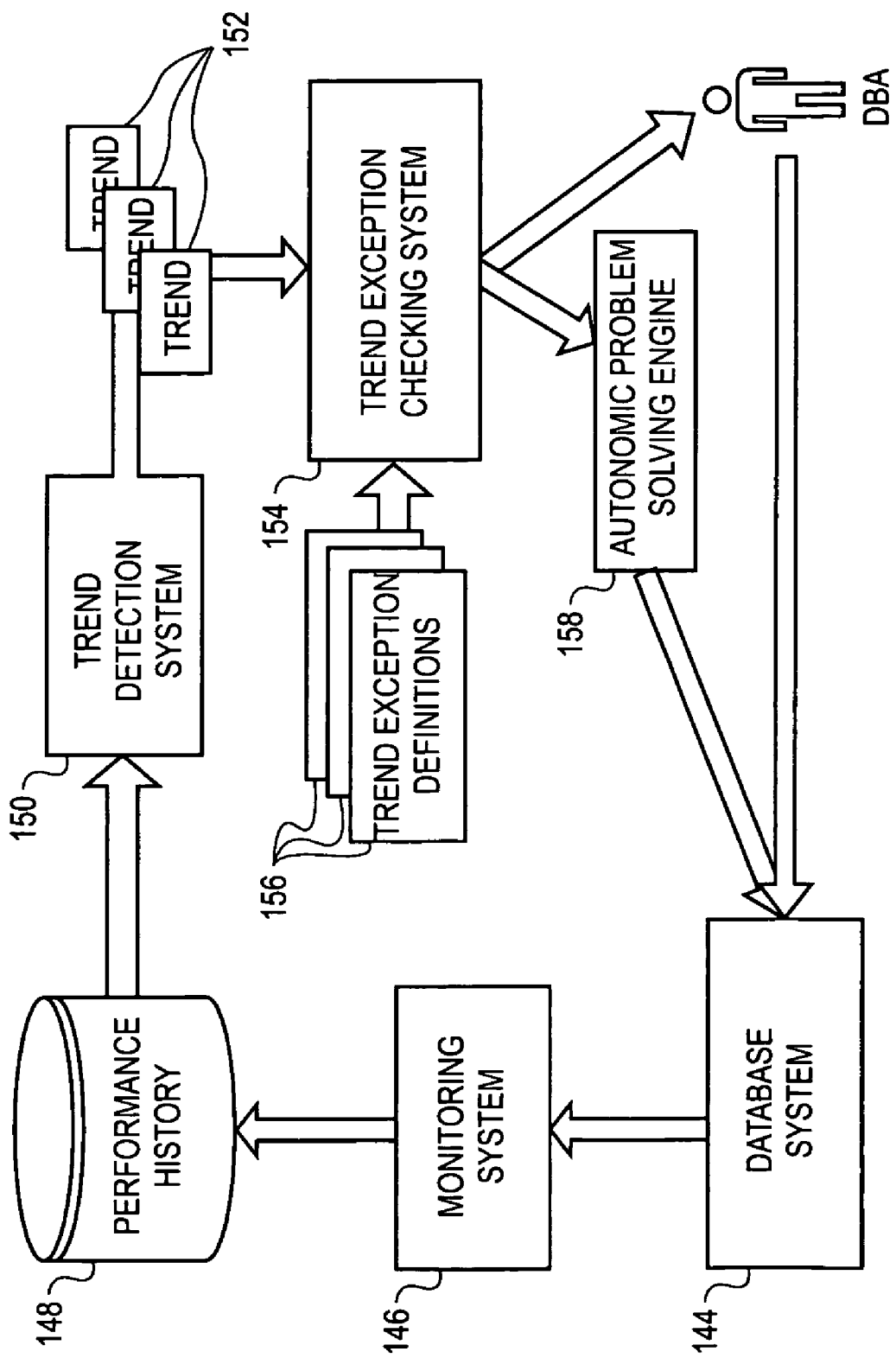
FIG. 4 is a schematic diagram illustrating the various components of a system implementing the present invention.

An overview of the architecture of a system in which the present invention is implemented is illustrated in FIG. 4. The basic idea is to have a service that proactively performs trend exception checking. For doing so, first the performance of a software application, a hardware device or the like have to be monitored. In FIG. 4 the performance of a database system 144 including, for example, a database software application and a storage device used by the database software application, is monitored.

The monitoring is performed by a monitoring system 146 comprising means to continuously measure performance parameters of the database system 144. Performance data, including data related to the time dependency of the performance parameters monitored by the monitoring system 146, is stored in a storage element 148. The performance data stored in the storage element 148 represents the performance history of the database system 144.

A trend detection system 150 analyzes the performance history to compute a mathematic function describing a time dependent development of the performance parameters stored within said storage element 148. For doing so, the trend detection system 150 comprises means to compute a mathematic function using the performance data.

Thereby the trend detection system 150 analyzes the performance history and generates a mathematic function describing a trend corresponding to the performance history.

Such a trend can be of different forms. The simplest case is a linear trend. More complex trends include exponential and alternating (sinusoidal) trends. A quality indication value that indicates the confidence of the trend as a percent is assigned to the trend, that is, to the mathematic function. The quality indication value is based on:

a) the sampling rate, describing how many events are considered to aggregate the trend compared to the overall number of events;
b) the absolute number of measurements; and
c) the deviation of real values gained from counter measurements compared to the trend curve.

The trend detection system 150 also comprises means to use said mathematic function to compute trend data 152 describing the time dependant development of the performance parameters in the future. The trend data 152 consists of the mathematic function and of the quality indication value describing the quality of the mathematic function.

A trend exception checking system 154 compares the trend data 152 with trend exception definitions 156. Said trend exception definitions 156 comprise selectable thresholds for the performance parameters, a selectable warning timeframe in which the performance parameters have to exceed their respective thresholds to generate an exception, and a quality threshold. The trend exception definitions 156 are settable by the database administrator (DBA). If the trend data 152 matches the trend exception definitions 156 a prediction is generated. The trend data 152 matches the trend exception definitions 156 when the trend data comprises a quality indication value exceeding the quality threshold, a performance parameter exceeding its threshold, and a point in time lying within the warning timeframe, a prediction is generated.

Generally there are two options to deal with the predictions. The first option is to inform the DBA. Thereby the DBA will have to organize all arrangements designated for a certain performance parameter exceeding its threshold.

The second option is to alternatively or additionally forward the prediction to an autonomic problem solving engine 158. Both the DBA and the autonomic problem solving engine 158 can organize all arrangements designated for a certain performance parameter exceeding its threshold, wherein preferably the arrangements are autonomously organized by the autonomic problem solving engine 158.

It is important that the trend exception checking system 154 takes special care to avoid false alarms. The present invention contemplates two methods of avoiding such false alarms. First, to support detailed mathematic functions taking into consideration long term trends such as, for example, periodic trends. Such trends might be alternating (sinusoidal, saw-tooth, etc.), exponential, or linear trends. An example for such a trend is the following:—

Each Monday morning: Table space 40% full
Each Saturday morning: Table space 70% full
Each Sunday: some records are pruned, wherein the table space fill grade is reduced from 70% to 40%.

A trend exception may be defined as table space fill grade threshold 95%, warning timeframe 1 month, quality threshold 80%.

By using the performance history, a mathematic function can be found describing an alternating trend with a period of one week. Since long term monitoring already takes place for more than the warning timeframe, the quality indication value will be computed to 95%.

By using the mathematic function, trend data 501 is computed that will not exceed the table space fill grade threshold within the warning timeframe. No prediction is generated.

The second way to avoid false alarms contemplated by the present invention involves evaluating the quality indication value of a mathematic function against a quality threshold comprised in the trend exception definitions 701. Thereby the quality indication value can be computed by using counter measurements. Predictions based on said mathematic function are allowed Only if the mathematic function is proven to be reliable.

While the present invention has been described in detail, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The invention claimed is:

1. A method of a computer system predicting a performance shortage of a first application of the computer system, the method comprising:

monitoring, with the computer system, at least one performance parameter of the first application to generate first performance data;

using said first performance data to compute a mathematic function with the computer system describing a time dependent development of said performance parameter wherein the mathematic function incorporates second performance data from a second application that corresponds to the performance parameter of the first application;

computing and assigning to said mathematic function with the computer system a quality indication value;

using said mathematical function to compute with the computer system a point in time when the performance parameter will exceed a selected threshold; and outputting with the computer system a prediction signal when said quality indication value is higher than a selected quality threshold and said point in time lies within a pre-determined timeframe, wherein said prediction signal indicates that a performance shortage of the application is expected near said point in time.

2. The method as set forth in claim 1, wherein the quality indication value is progressively more accurate the longer the monitoring takes place.

3. The method as set forth in claim 1, further comprising verifying the mathematic function by comparing computed trend data with real measured values.

4. The method as set forth in claim 3, wherein the mathematical function is verified to compute the quality of the mathematic function.

5. The method as set forth in claim 3, wherein the mathematical function is selectably verified either continuously or in settable intervals.

6. The method as set forth in claim 1, wherein the monitoring of the performance parameter and storing of performance data selectably takes place either continuously or in selectable intervals.

7. The method as set forth in claim 1, wherein computing the mathematic function takes place continuously.

8. The method as set forth in claim 1, wherein computing the mathematic function takes place in selectable intervals.

9. The method as set forth in claim 1, wherein the monitored performance parameter includes memory usage by said first application.

10. The method as set forth in claim 1, wherein the monitored performance parameter includes storage used by said first application.

11. The method as set forth in claim 1, wherein the monitored performance parameter includes the CPU capacity used by said first application.

12. The method as set forth in claim 1, wherein the monitored performance parameter includes the frequency of processes performed by said first application.

13. The method as set forth in claim 1, wherein the monitored performance parameter includes the access time of said first application.

14. A computer-readable medium containing a set of instructions for causing a computer system to output a prediction signal indicating a point in time when a performance shortage is expected to occur in a first application, the set of instructions comprising:
 a monitor code segment for monitoring at least one performance parameter of the first application and generating first performance data;
 a math function code segment for using the first performance data to compute a mathematic function describing a time dependent development of said performance parameter wherein the mathematic function incorporates second performance data from a second application that corresponds to the performance parameter of the first application;
 a quality code segment for computing and assigning to said mathematic function a quality indication value;
 a calculation code segment for using said mathematical function to compute a point in time when the performance parameter will exceed a selected threshold; and
 a prediction code segment for instructing the computer system to output a prediction signal when said quality indication value is higher than a selected quality threshold and said point in time lies within a pre-determined time frame, wherein the prediction signal indicates that a performance shortage of the application is expected near said point in time.

15. The computer-readable medium as set forth in claim 14, wherein the quality code segment computes the quality value by comparing performance trend data with real measured values, and wherein the quality value is progressively more accurate the longer the monitoring takes place.

16. The computer-readable medium as set forth in claim 14, wherein the performance parameter is chosen from the group consisting of memory usage, storage medium usage, CPU usage, frequency of processes, and access time.

17. The method as set forth in claim 1, further comprising providing the prediction signal to an autonomic problem solving engine.

18. The method as set forth in claim 14, further a problem solving code segment for providing the prediction signal to an autonomic problem solving engine.

* * * * *

UNITED STATES PATENT AND TRADEMARK OFFICE
CERTIFICATE OF CORRECTION

| | |
|---|---|
| PATENT NO. | : 7,698,113 B2 |
| APPLICATION NO. | : 11/432653 |
| DATED | : April 13, 2010 |
| INVENTOR(S) | : Torsten Steinbach and Michael Reichert |

It is certified that error appears in the above-identified patent and that said Letters Patent is hereby corrected as shown below:

On the Title Page, Item (75)

(spelling correction to "First Name" of inventor, Torsten Steinbach) should read, Inventors: Steinbach; Torsten (Boeblingen, DE), Reichert; Michael (Schoenaich, DE)

Signed and Sealed this

Twenty-ninth Day of June, 2010

David J. Kappos
*Director of the United States Patent and Trademark Office*